Oct. 2, 1934.  C. E. FORREST  1,975,541

MEANS FOR PRESERVING FOOD STUFFS

Filed June 7, 1933  4 Sheets-Sheet 1

Inventor
Charles E. Forrest
By Clarence A. O'Brien
Attorney

Oct. 2, 1934. C. E. FORREST 1,975,541
MEANS FOR PRESERVING FOOD STUFFS
Filed June 7, 1933   4 Sheets-Sheet 3

Inventor
Charles E. Forrest
By Clarence A. O'Brien
Attorney

Oct. 2, 1934.                C. E. FORREST                1,975,541
                    MEANS FOR PRESERVING FOOD STUFFS
                    Filed June 7, 1933        4 Sheets-Sheet 4

Inventor
Charles E. Forrest
By Clarence A. O'Brien
Attorney

Patented Oct. 2, 1934

1,975,541

UNITED STATES PATENT OFFICE 1,975,541

MEANS FOR PRESERVING FOOD STUFFS

Charles E. Forrest, Los Angeles, Calif., assignor of one-fifth to Frank T. Bowles, Los Angeles, Calif.

Application June 7, 1933, Serial No. 674,739

1 Claim. (Cl. 99—2)

This invention has as its object to provide for the preservation of food stuffs, especially fruit and vegetables during the transportation thereof and consists in the provision of a receptacle, the latter being preferably in the nature of a box adapted to be mounted on a wagon frame or motor truck chassis and to receive therein the fruits, vegetables or the like together with means for evacuating the interior of the same as well as for evacuating an air space provided in the wall thereof, in addition to means for forcing oxygen into the container or vehicle box.

The invention together with its numerous objects and advantages will be best understood from a study of the following description, taken in connection with the accompanying drawings wherein.

Figure 1:
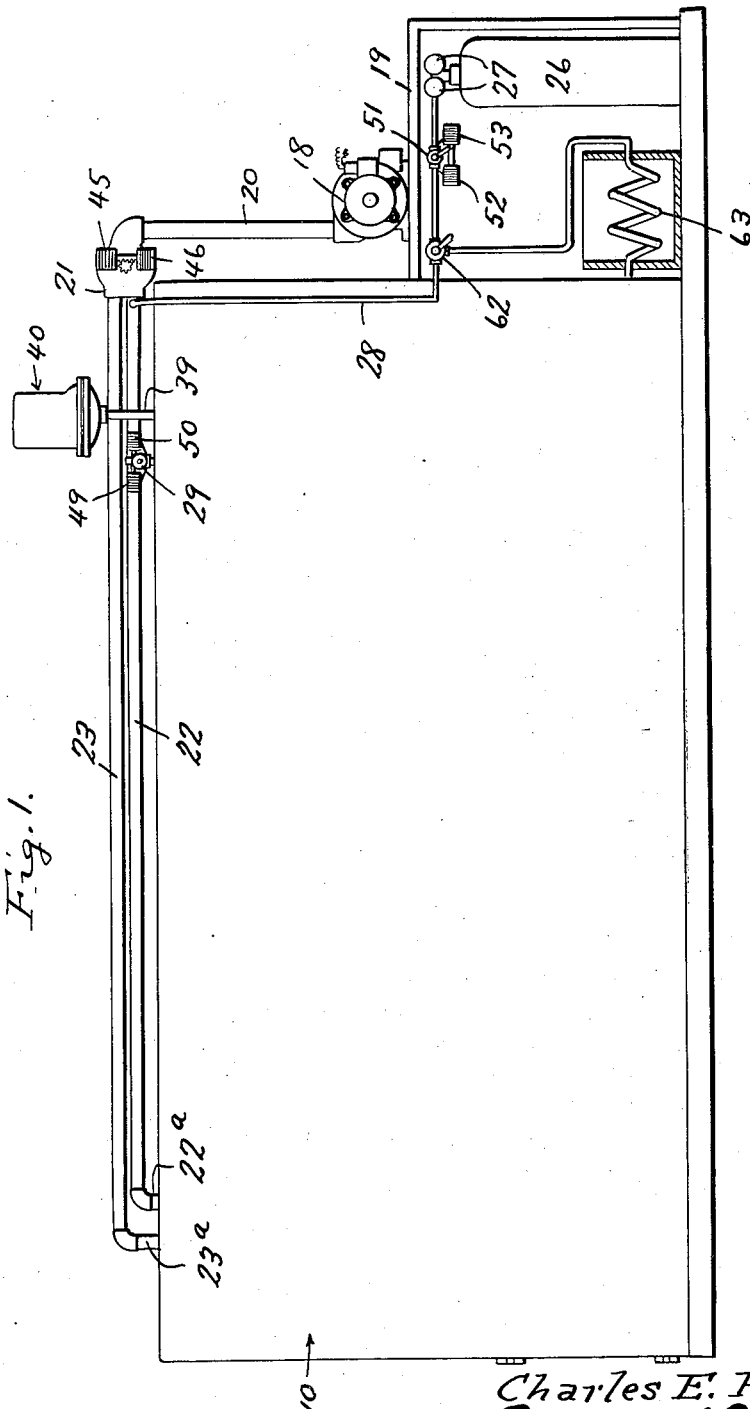
Figure 1 is a side elevational view of the apparatus.
Figure 2:
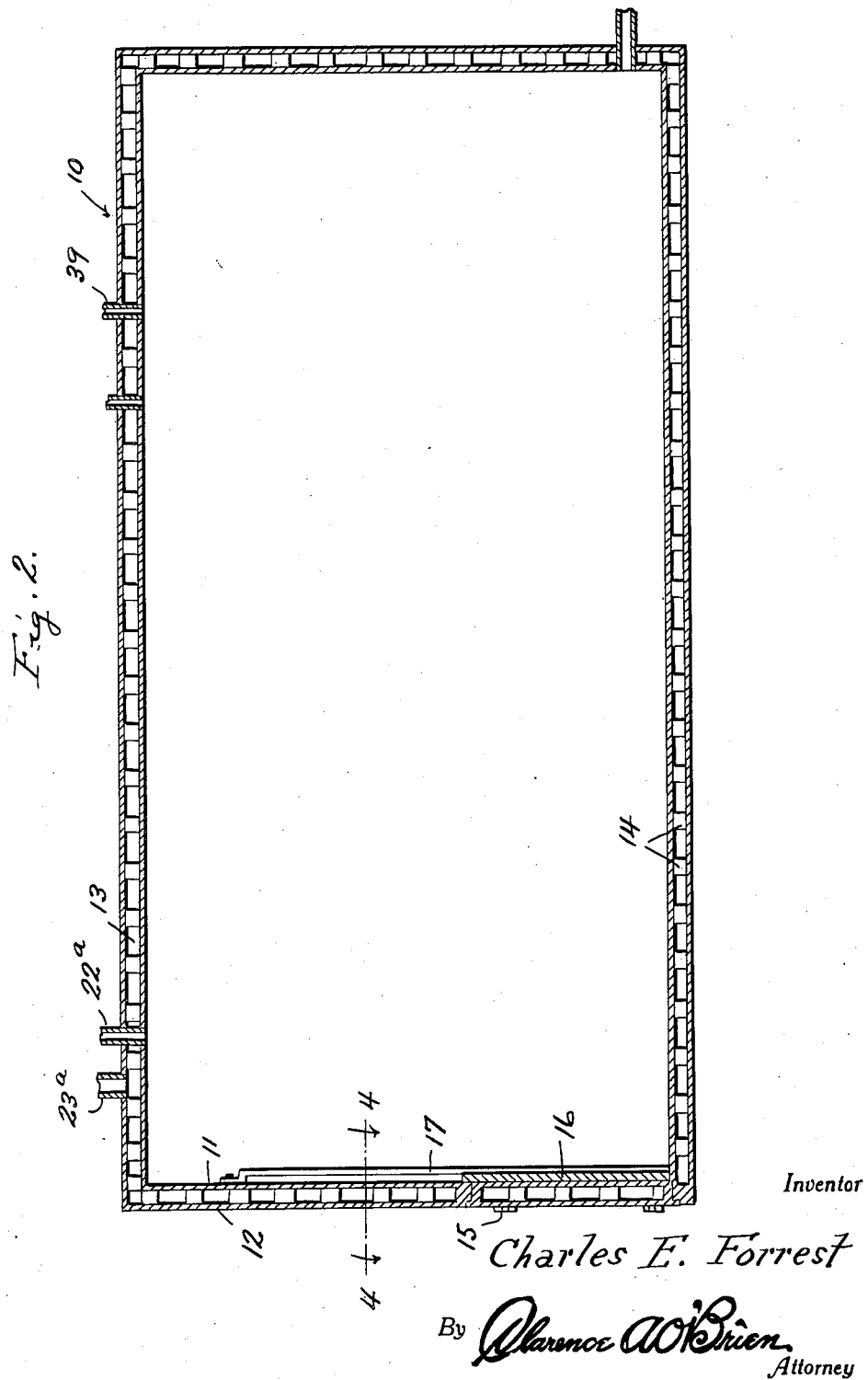
Figure 2 is a longitudinal sectional view through the casing or box.
Figure 3:
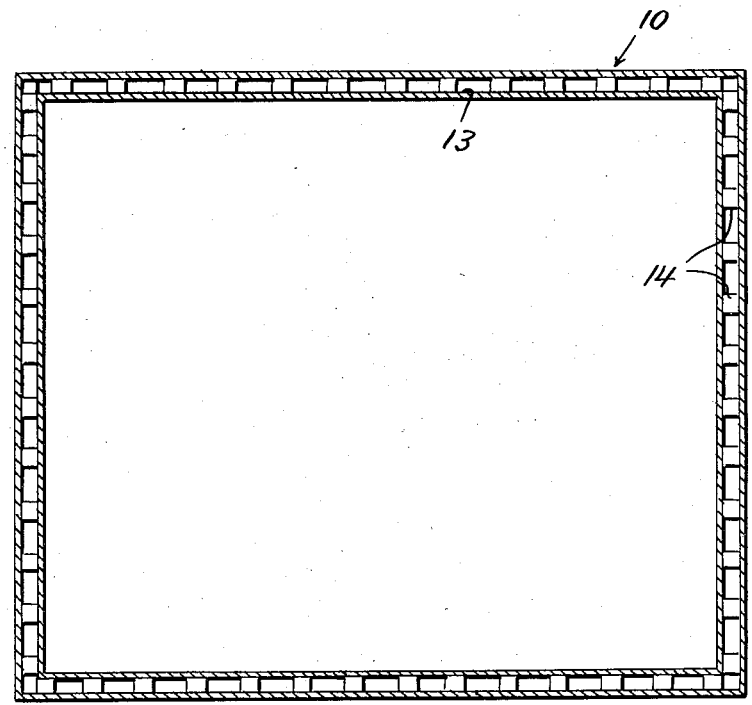
Figure 3 is a transverse sectional view therethrough.
Figure 4:
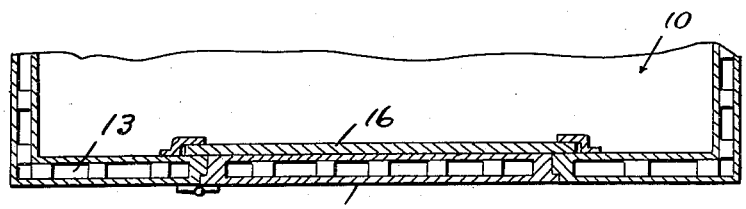
Figure 4 is a fragmentary detail sectional view taken substantially on the line 4—4 of Figure 2.

Referring to the drawings by reference numerals it will be seen that the invention comprehends the provision of a container or casing 10 which if desired may be readily mounted on the chassis of a motor truck, or on the frame of a wagon or if desired may be also used as the body of railroad rolling stock. The member 10 which may be hereinafter uniformly referred to as a container is provided with a bottom, top, sides and end walls composed of inner and outer sheets 11, 12 of any suitable material and relatively spaced to provide therebetween a dead air space 13. Between the inner and outer layers or sheets there are strips 14 of insulating material preferably cork. In the rear wall thereof the container is provided with an opening and for this opening there are provided a hinged door 15 and an inner vertically slidable door 16 operating in suitable guides 17.

For evacuating the interior of the container 10, and the air space 13 there is located, in the present instance adjacent the forward end of the container 10 a suitable pump 18 mounted on a suitable support 19. Extending from one side of the pump 18 is a pipe 20 which is connected with one side of a valve 21. Pipes 22, 23 lead from a second side of the valve 21 and pipe 22 is connected with the interior of the container 10 through the medium of a short pipe section 22a while pipe 23 is connected with the space 13 through the medium of a short pipe section 23a, pipe sections 22a, 23a, being located adjacent the rear end of the container.

The valve 21 is provided with a valve core 24 provided with a single passage 25 for controlling communication between pipe 20 and the pipes 22, 23.

There is also provided an oxygen tank 26 provided with control valves 27 and also with a conduit pipe 28 connecting the tank 26 with the pipe 22 for supplying oxygen to the interior of the container 10. A valve device 29 is also provided for venting the interior of the container 10 while a pipe 39 also leads through the top of the container 10 and connects the interior of the same with a casing 40 in which are located a pressure responsive device and circuit controlling means operatively connected with the pressure responsive device so that, as will be made manifest, means is provided for effecting, in a substantially automatic manner, the evacuation of the container 10, and its dead air space 13, and also the supply of oxygen to the container.

Figure 5:
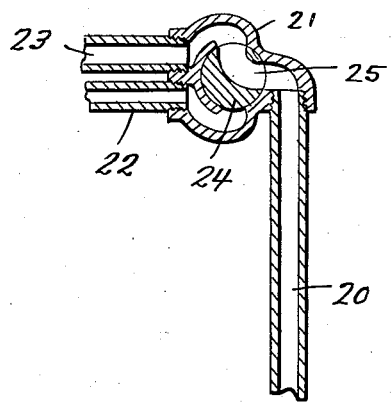
Figure 5 is a fragmentary sectional view through a valve and conduit pipe connected therewith.
Figure 6:
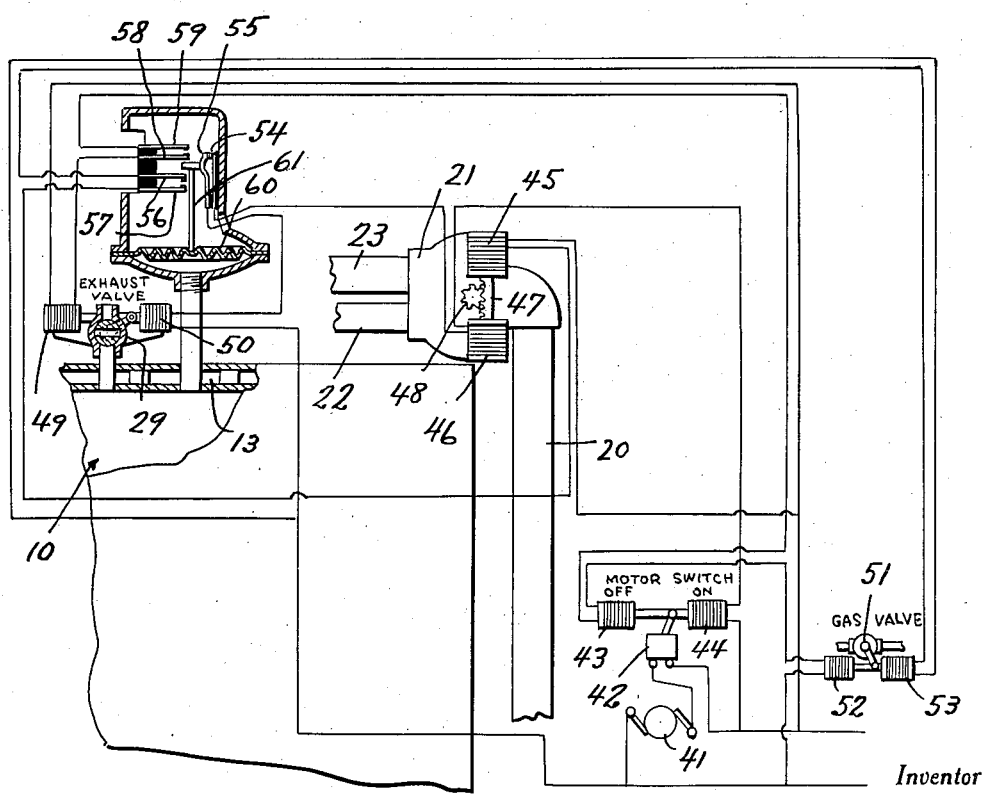
Figure 6 is a diagrammatic view showing the wiring system.

Referring now to the diagrammatic view of Figure 6 it will be seen that the motor for the pump 18 is designated generally by the reference character 41 controlled by a switch 42 that is operatively connected with a pair of magnets 43, 44. For the valve 24 there is provided a pair of magnets 45, 46 having a common armature 47 provided with rack teeth engaging a pinion 48 provided on the stem of the valve 24. The vent valve 29 is also operatively connected in any suitable manner with an armature common to a pair of magnets 49, 50. Also, arranged in the pipe 28 is a control valve 51 suitably connected with an armature common to a pair of magnets 52, 53. Arranged in the aforementioned casing 40 are a pair of contacts including a relatively fixed contact 54 and a relatively movable or spring contact 55; a second pair of contacts 56, 57 and a third pair of contacts 58, 59 which in the present instance parallel the contacts 56, 57 and extends at right angles to the contacts 54, 55. Also arranged in the casing 40 is a pressure responsive member, the same in the present instance being in the nature of a diaphragm 60 and connected with the diaphragm 60 is a stem 61 having at its free end a head engageable with the contacts 55, 56 and 58 for controlling engagement of said contacts with their respective cooperating contacts 54, 57 and 59 respectively. The motor for the pump, the various magnets, and the contacts are all suitably arranged in electrical circuit in a manner to provide for an automatic evacuation of the container 10 and space 13 and the supply of oxygen to the container. From the above it will be apparent that in operation, when the switch 42 under action of the magnet 44 is moved to an "on" position the pump 18 will be operated for evacuating the container and its dead air space. Thus it will be apparent that during the evacuation of the interior of the container 10 current is supplied to the magnet 46 for moving the armature 47 downwardly to rotate the valve 24 for placing the passage 25 in position to establish communication between the pipe 22 and pipe 20. As the container 10 is being thus evacuated the diaphragm 60 will be as shown in Figure 6 so that the head of the plunger 61 will engage the contact 50 for holding the same engaged with the contact 54 and thereby insure a supply of current through the magnet 50 to hold the valve 29 in closed position. When the tank 10 has been fully evacuated the diaphragm 60 will flex downwardly sufficiently to move the head of the stem 61 out of engagement with the contact 55 thus permitting the contacts 54, 55 to separate and the head of said stem will then engage the contact 56 for moving the same into engagement with the contact 57 thereby cutting off the current to the magnet 46 and causing a supply of current to pass through the magnet 45 for moving the valve 24 to the position shown in Figure 5. As therein shown passage 25 establishes communication between pipes 20 and 23 evacuating the space 13. The engagement of the contacts 56, 57 close the circuit through the magnet 53 resulting in the valve 51 being moved to an open position so that oxygen will then pass from the tank 26, through the pipe 28, and pipe 22 into the interior of the container 10.

When the pressure of oxygen within the tank or container rises sufficiently to flex the diaphragm 60 upwardly the head of stem 61 will then move into engagement with the contact 58 for engaging said contact with contact 59 thus completing the circuit through the magnet 49 for opening the valve 29 to vent the same. Also the circuit will be completed through the magnet 43 for throwing the switch 42 for stopping the motor 41; in addition the circuit to the magnet 52 is closed for moving the valve 51 to a closed position for shutting off the supply of oxygen to the container. Now, when the pressure in the tank 10 (the supply of oxygen having been cut off) falls sufficiently to permit the diaphragm 60 to return to the position shown in Figure 6 it will be apparent that contact 55 will be engaged with contact 54 for closing the circuit through the magnet 46 to actuate the valve 24 to reestablish communication beween pipe 22 and pipe 20; through the magnet 44 to open switch 42 and start the motor 41 and the cycle of operation then continued for evacuating the container 10, the air space 13, and subsequently again supplying oxygen to the container.

If for cooling purposes, a low temperature is desired in the container 10 the oxygen from the tank may be directed through a manually operated three way valve 62 and refrigerating coil 63 into the tank as will be clear from a consideration of Figure 1.

It will also be apparent that a device of this character may be used for the purpose of drying out grains or other seeds through the medium of a vacuum process for preserving the grain for a prolonged period of time.

Even though I have herein shown and described the preferred embodiment of the invention it is to be understood that it is in no wise intended to restrict the invention beyond the requirements of the prior art and scope of the appended claim.

Having thus described my invention, what I claim as new is:

An apparatus for preserving food stuffs comprising a chamber having inner and outer spaced walls providing therebetween an air space surrounding the chamber, evacuating mechanism connected with said container and with said space for evacuating them, a source of oxygen supply connected with the container, and pressure responsive control mechanism connected with the container, said evacuating means, and said oxygen supply means for automatically bringing about the evacuation of said container and air space and the supply of oxygen under pressure to the interior of the container.

CHARLES E. FORREST.